F. EGGE,

Assignor to the SMITH & EGGE MANUFACTURING CO.

SASH CORD FASTENER.

No. 9,844. Reissued Aug. 23, 1881.

Witnesses.

Robert Everett.

F. M. Smith Jr.

Inventor.

Frederick Egge.

by Wm. C. Rw. Seton Atty.

N. PETERS. Photo-Lithographer. Washington, D. C.

UNITED STATES PATENT OFFICE.

FREDERICK EGGE, OF BRIDGEPORT, CONNECTICUT, ASSIGNOR TO THE SMITH & EGGE MANUFACTURING COMPANY, OF SAME PLACE.

SASH-CORD FASTENER.

SPECIFICATION forming part of Reissued Letters Patent No. 9,844, dated August 23, 1881.

Original No. 212,136, dated February 11, 1879. Application for reissue filed February 11, 1881.

*To all whom it may concern:*

Be it known that I, FREDERICK EGGE, of Bridgeport, Fairfield county, Connecticut, have invented certain new and useful Improvements in Sash-Weight Attachments, of which the following is a specification.

My improvements, while more especially relating to sash-balance fixtures or weight attachments of the class in which chains are used to connect the weights and sashes, are applicable, generally, to such fixtures or attachments.

My objects are to facilitate the connection of the weight to the chain or its equivalent, to give strength and security to the connection between these parts, and to provide a simple and readily-applicable device or fixture for securing the chain to the sash.

My invention consists, as will hereinafter first be fully explained, and then specifically pointed out in the claims, in an improved hook for connecting the weight with the chain, &c., at two points, one above the other; in a peculiar bracket and loop connection between the chain, &c., and the sash; and in the novel combination of parts.

Figure 1:
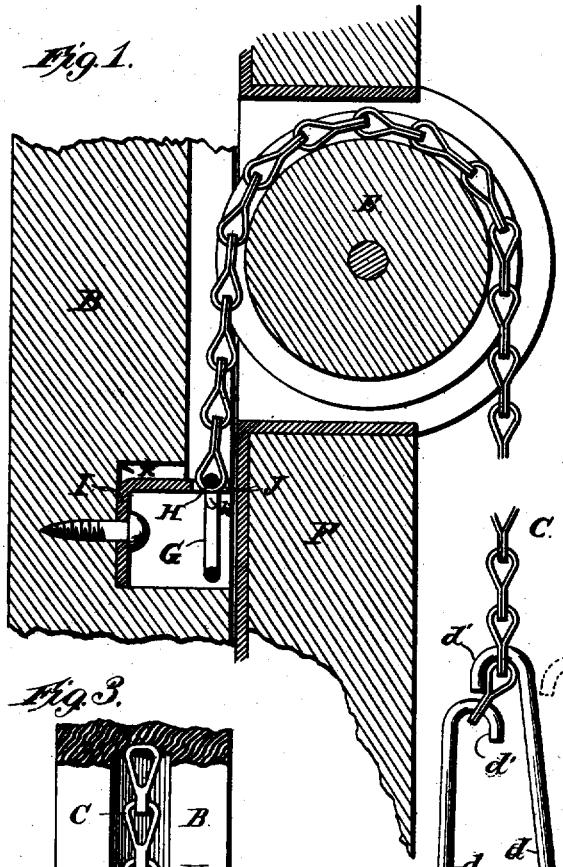
Figure 2:
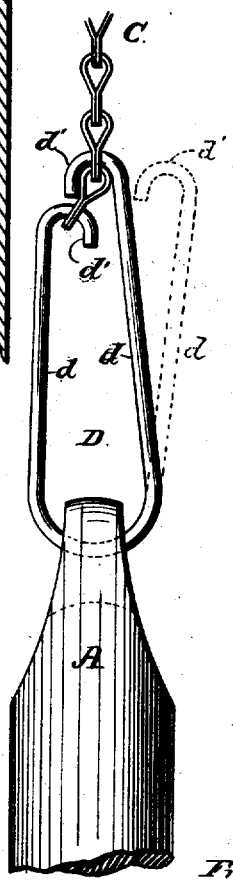
Figure 2:
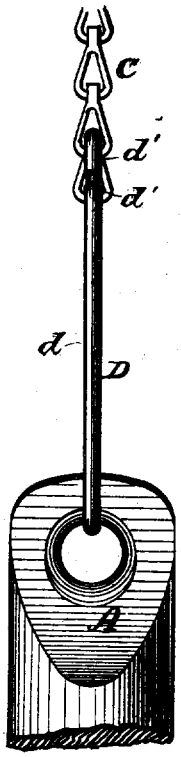
Figure 3:
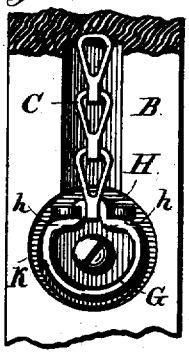
Figure 4:
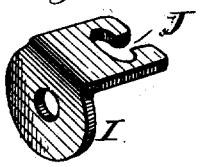

In the accompanying drawings, which show so much only of a sash and window-frame with my improvements applied as is necessary to illustrate the invention claimed, Figure 1 is a view, partly in elevation and partly in vertical section, showing all my improvements applied to the sash. Fig. 2 is a view, in elevation, at a right angle to Fig. 1, showing the hook and portions of the chain and weight connected by it; Fig. 3, a similar view, showing the connection between the chain and sash; and Fig. 4, a view, in perspective, of the slotted bracket or angle-piece with which the lugged loop of the chain is engaged.

The flexible connection between the weight A and sash B is preferably made by a sheet-metal chain, C, such as shown in the drawings. I do not, however, confine myself to the employment of such a chain, as instead of it any suitable chain may be used, or a metallic band, or even a rope or cord. When used the band would have to be provided with two slots and the cord with two loops, to be engaged by a weight-hook, D, presently to be described. The chain, &c., pass over a grooved pulley, E, in the window-frame F, and are connected with the sash by means of a loop or curved link, G, having a shouldered lug or projection, H, and an angle-plate or bent bracket, I, provided with a cross-opening or T-slot, J, with which the lugged and shouldered loop or link engages. The bracket is removably secured in the slot or recess K in the sash by a screw. To connect the loop or link G with the sash it is pushed into the recess K toward the back of the bracket, and with its lug H clear of the entrance to the T-slot. When in proper position a pull on the chain draws the loop to its seat in the bracket, the lug of the loop passing into the head or cross-opening of the slot, and resting with its shoulders *h h* against the bracket at the ends of the cross-opening or head of the T-slot, as shown in Figs. 1 and 3. The strain on the loop by the chain and weight prevents its accidental displacement, while the connection is such as to admit of the ready separation or disconnection of the loop and bracket to detach the chain from the sash, as will readily be understood from the drawings.

The weight-securing hook D is made with two spring-arms, *d d*, terminating in hooks *d′ d′*, which are caused to engage with two links of the chain, one above the other. The lower closed and looped or bowed end of the spring-hook engages the weight A. The hook of the longer spring-arm or member of the hook engages the link next to the end one, while the hook of the shorter spring-arm engages the end link of the chain. The hook is engaged with the weight by passing one of its arms through the hole or eye therein when the arms are spread apart or are in their normal position before connection with the chain. The spring of the hooked arms enables them to be compressed at their outer or top ends and moved toward each other in a common plane, so that when compressed and attached to the chain the one hook is directly over the other, and both are in the vertical plane of the chain-slots or link-openings. The hooks, it should be observed, project inward or toward each other. By thus engaging the chain at two points (or entering the hooks into two slots or eyes in a metal band, or in two loops in a cord) it is obvious that additional strength and greater security are attained. Wear between the hooks and chain is divided between two joints or points of contact, instead of being confined to one, as usual.

The hooks may be made cheaper, and be applied and removed more readily than the ordinary "sister-hooks," in which a spring-bow is made at one end and the hooked ends lap at their sides or lie against each other.

I am aware that two-armed sectional or jointed hooks have heretofore been made, and do not claim such; but I am not aware of any hook, prior to my invention, made of a single rod or wire and having two hook-arms, one longer than the other, so as to cause one hook to overhang or lie above the other when the arms are pressed inward or toward each other to engage a chain, &c., at two points.

I claim as of my own invention—

1. The weight-hook D, made of a single rod or wire and having its ends formed into two hook-arms, one above or longer than the other, so that when pressed together to form a connection with the chain the bearing-points of the two hooks are in substantially the same vertical plane, as hereinbefore set forth.

2. The combination, substantially as hereinbefore set forth, of the sheet-metal chain, the spring-hook connected with one end of the chain and adapted to engage the sash-weight, and the loop or curved link having a shouldered lug or projection, to which the opposite end of the chain is attached and held in place when in position.

3. The combination, substantially as hereinbefore set forth, of the sash-chain, the hook having two hook-ended spring-arms of different lengths, and the sash-weight engaged by the bow or lower end of the hook.

4. The combination, substantially as hereinbefore set forth, of the bracket or angle-piece having a T-slot, the lugged and shouldered loop engaging with said bracket, and the chain, for the purpose specified.

5. The combination of the T-slotted bracket or angle-piece, the loop, lugged and shouldered, the chain or its equivalent, as specified, the hook, and the weight, these members being constructed and operating substantially as hereinbefore set forth, whereby they are adapted for ready connection together and attachment to a sash, and may quickly be disconnected from each other and from the sash, as described.

In testimony whereof I have hereunto subscribed my name this 3d day of February, A. D. 1881.

FREDERICK EGGE.

In presence of—
ISAAC LEE FERRIS,
ROBERT L. SEWARD.